United States Patent

Miller et al.

[11] Patent Number: 5,281,344
[45] Date of Patent: Jan. 25, 1994

[54] REGENERABLE SORBENT SYSTEM

[75] Inventors: John P. Miller, Tioga Center; P. Glenn Barkley, Cortland; Dana E. Gingrich; Donald H. White, Jr., both of Homer, all of N.Y.

[73] Assignee: Pall Corporation, East Hills, N.Y.

[21] Appl. No.: 824,403

[22] Filed: Jan. 23, 1992

[51] Int. Cl.$^5$ .............................................. B01D 24/46
[52] U.S. Cl. .................................... 210/798; 210/181; 210/195.1; 210/275
[58] Field of Search .................. 210/798, 663, 195.1, 210/670, 677, 650, 792, 900, 257.2, 275, 181, 791, 636, 195.1, 275, 333.01, 333.1

[56] References Cited

U.S. PATENT DOCUMENTS

| | | |
|---|---|---|
| 1,993,345 | 3/1935 | Jones . |
| 3,351,550 | 3/1964 | Kriker, Jr. .......................... 210/677 |
| 3,709,364 | 1/1973 | Savage ................................ 210/275 |
| 3,870,633 | 3/1975 | Setterstrom ........................ 210/275 |
| 3,915,857 | 10/1975 | Olson ................................. 210/275 |
| 3,994,803 | 11/1976 | Neff et al. ........................... 210/275 |
| 4,075,281 | 2/1978 | Port et al. . |
| 4,081,365 | 3/1978 | White et al. . |
| 4,161,446 | 7/1979 | Coillet ................................. 210/181 |
| 4,237,007 | 12/1980 | Marquardt ......................... 210/181 |
| 4,332,685 | 6/1982 | Nowlin et al. ..................... 210/257.2 |
| 4,725,361 | 2/1988 | Fleming ............................. 210/673 |
| 5,032,265 | 7/1991 | Jha et al. ........................... 210/195.2 |
| 5,093,012 | 3/1992 | Bundy et al. ...................... 210/195.1 |

Primary Examiner—Robert A. Dawson
Assistant Examiner—Ana M. Fortuna
Attorney, Agent, or Firm—Leydig, Voit & Mayer, Ltd.

[57] ABSTRACT

A process and apparatus for treating contaminated water involving passing water containing contaminants as a stream through a filter to remove the contaminants and form a purified water stream, directing the purified water stream to an effluent discharge outlet and accumulating a portion of the purified water in a reservoir under pressure, preferably through action of a trapped air pocket in the reservoir, and regenerating the filter by using the purified water in the reservoir to back-flush the filter.

29 Claims, 2 Drawing Sheets

REGENERABLE SORBENT SYSTEM

TECHNICAL FIELD OF THE INVENTION

This invention relates to an apparatus and process for treating a contaminated fluid, particularly contaminated water, in a system providing for the regeneration of the filters used to remove the contaminants from the contaminated fluid.

BACKGROUND OF THE INVENTION

There have been developed a multitude of filters and filtration systems to remove contaminants from contaminated fluids, particularly contaminated water. While many of the filters function effectively for purifying contaminated water, the filters eventually become clogged with the removed contaminants and must be replaced periodically to ensure satisfactory filtration. Alternatively, the filters can be back-flushed to regenerate the filters to extend the useful life of the filters. The regeneration of the filters, however, is sometimes as troublesome as replacing the filter and may involve substantial quantities of wash solutions. Some of the filtration systems that have been previously devised are described below.

U.S. Pat. No. 1,993,345 discloses a process for reviving an adsorbent bed such as of activated carbon, activated alumina, and silica gel by employing superheated steam for the heating of the adsorbent and the driving out of impurities and then very suddenly chilling the adsorbent throughout the bed by totally or partially flooding the adsorbent with liquid carbon dioxide.

U.S. Pat. No. 4,075,281 pertains to the purification of carbonate process solutions which comprises passing the carbonate process solution through a bed of activated carbon to remove organic contaminants until the adsorbent capacity of the bed is reduced and then regenerating the adsorbent bed by passing an aqueous solution at elevated temperature through the adsorbent bed to remove the adsorbed organic contaminants. The temperature of the hot aqueous wash is about 50°–95° C., preferably 60°–90° C. Multiple aqueous washes may be employed, with such aqueous washes employing previously employed aqueous washes. For example, the adsorbent bed may be purified by an initial wash with the contaminated solution, followed by a slightly contaminated solution wash, and lastly with a substantially purified aqueous solution wash. The wash solutions can then be reused in the next washing cycle, e.g., the slightly contaminated wash solution may be reused as a contaminated solution wash in the next adsorbent bed purification cycle.

U.S. Pat. No. 4,081,365 discloses a process for use in water purification, particularly in sewage treatment, in which the sewage is subjected to a primary biological treatment and a secondary settling treatment, with the primary-secondary effluent being subjected to a tertiary treatment by passage through a mixed filtration and adsorption bed containing activated carbon. The mixed bed is periodically regenerated by a partial wet-gas oxygenation cycle, utilizing a reflux operation in which the products of regeneration are returned to the primary treatment and in which the final effluent is conceivably, with the addition of chlorination, potable water. The disclosed system contemplates a storage system for renovating water which receives effluent from the tertiary treatment, can be heated, and then is used in connection with the reactivation or regeneration of the material of the tertiary treatment system.

U.S. Pat. No. 4,161,446 describes a process for the treatment of ground water to render it potable by prefiltration, degassing, passing through thermal ion exchange desalination resins, and reverse osmosis treatment. After prefiltration and degassing, most of the water is directed to the thermal ion exchange resin, while a portion is heated to about 60°–98° C. and directed to a thermal storage unit. After the thermal ion exchange resin becomes contaminated and relatively ineffective, the water flow through the thermal ion exchange resin is redirected to the thermal storage unit, and the thermal storage unit water is used to back-flush the thermal ion exchange resin and thereby regenerate it. The portion of the regenerate wash which is heavily contaminated with undesirable salts may be withdrawn and passed to waste disposal, while the remaining portion which is relatively free of undesirable contaminants may be recycled, passed through a heat exchanger (with the extracted heat being passed to the raw ground water inflow to the prefilters), subjected to a heat pump system (in which the extracted residual heat is passed to the thermal storage unit), and treated in a reverse osmosis system to provide potable water which is commingled with the potable water provided by the thermal ion exchange resin.

U.S. Pat. No. 4,725,361 discloses a process for the removal of trihalocarbons from water. Water contaminated with a trihalocarbon is passed through a first or second bed containing particles of an activated composite adsorbent comprising alumina and zeolite. The trihalocarbon is adsorbed onto the particles, thereby reducing the trihalocarbon concentration in the water. The adsorbed trihalocarbon is reacted with air or steam at an elevated temperature in order to regenerate the adsorbent particles for reuse. Gaseous hydrochloric acid produced in the reaction with air or steam may be adsorbed in a third bed containing adsorbent agglomerates.

While the prior art discloses a variety of ways of purifying fluids, particularly water, and of regenerating the filters used in the purification processes, there remains a need for a simple and economical purification and regeneration process which results in a minimum of waste fluid.

BRIEF SUMMARY OF THE INVENTION

It is an object of the present invention to provide a filter system for the purification of fluids, particularly water, which allows for the easy back-flushing of the filter medium.

It is another object of the present invention to provide a regenerable sorbent system which utilizes a minimum of water for the regeneration of the sorbent.

It is a further object of the present invention to provide a regenerable sorbent system which minimizes waste fluid from regeneration of the sorbent.

These and other objects and advantages of the present invention will be apparent from the description of the invention provided herein.

The present invention pertains to a process and an apparatus for purifying a fluid, particularly water, using a filter which can be regenerated by a back-flushing operation. The process for treating contaminated water in accordance with the present invention involves the steps of (a) passing water containing a contaminant as a stream through a filter to remove the contaminant and form a purified water stream, (b) directing the purified water stream to an effluent discharge outlet and accumulating a portion of the purified water in a reservoir under pressure, preferably through action of a trapped air pocket in the reservoir, and (c) regenerating the filter by using the purified water in the reservoir to back-flush the filter. The present inventive apparatus for treating contaminated water comprises (a) a housing having an inlet and an outlet, (b) a filter medium having an upstream side and a downstream side and positioned in the housing between the inlet and the outlet so as to be capable of removing contaminants from the contaminated water, (c) a contaminated water supply intake in fluid communication with the housing inlet, (d) an effluent discharge outlet in fluid communication with the housing outlet, (e) a drain in fluid communication with the upstream side of the filter medium, and (f) a reservoir in fluid communication with downstream side of the filter medium such that a contaminated water stream flowing into the housing through the housing inlet contacts the upstream side of the filter medium and forms a purified water stream flowing from the housing through the housing outlet which enters the reservoir and is maintained under pressure therein, preferably through action of a trapped air pocket in the reservoir, the purified water in the reservoir being available to back-flush the filter medium to transport the removed contaminants from the filter medium through the drain.

DESCRIPTION OF THE PREFERRED EMBODIMENTS

The present inventive process for treating contaminated water comprises the steps of passing water containing contaminants as a stream through a filter to remove the contaminants and form a purified water stream, directing the purified water stream to an effluent discharge outlet and accumulating a portion of the purified water in a reservoir under pressure, and regenerating the filter by using the purified water in the reservoir to back-flush the filter. The purified water is maintained under pressure in the reservoir through any suitable means so as to ensure that the purified water in the reservoir can be used to back-flush the filter as needed. Such a pressure condition can be created through action of a trapped air pocket in the reservoir, by use of an external source of compressed air or gas, or by venting the reservoir and elevating it so that the static head will be sufficient to affect the supply of purified water during regeneration.

The purified water flowing into the reservoir is maintained therein until use to back-flush the filter by any suitable means, preferably by action of the pressure of the purified water from the housing outlet to the effluent discharge outlet. Such pressure may be maintained by any of a variety of means, such as by use of a flow restricting device, e.g., a properly sized orifice plate or an automatic back-pressure control valve, positioned prior to the effluent discharge outlet and by use of an elevated discharge of sufficient height and vented at its zenith.

While the filter can be back-flushed with only the purified water maintained at room temperature, the filter can be typically more economically regenerated by back-flushing the filter with hot water. Most preferably, the filter is back-flushed with the purified water at room temperature in the reservoir after the filter is back-flushed with hot water. The hot water can be obtained from any suitable source, such as purified water from the reservoir which has been heated, separately available heated purified water, or contaminated water which has been heated so long as the contaminated water is subsequently purged from downstream of the filter. The heater used to provide hot water for regeneration may be of any suitable design, for example, an electric hot water heater, an oil or gas fired heater, or a shell and tube type heat exchanger with a hot fluid supply.

The back-flush water may be passed through a second filter to remove the contaminants therefrom and form a purified water stream, and the second filter may also be back-flushed with purified water from the reservoir and/or hot water as with the first filter. When hot water is used to back-flush a filter and that back-flush water is to be directed to a second filter for purification, the back-flush water from the first filter is preferably cooled before passing through the second filter, preferably by passing the back-flush water through a heat exchanger which in turn heats any contaminated water used to back-flush the first and second filters. Any suitable heat exchanger may be so used, such as a shell and tube type heat exchanger, a plate type heat exchanger, and an indirect heating and cooling system such as with a freon refrigeration system.

The invention may best be understood with reference to the accompanying drawings wherein illustrative embodiments of preferred apparatus useful in carrying out the present inventive process are shown and in the following detailed description of the preferred embodiments.

Figure 1:
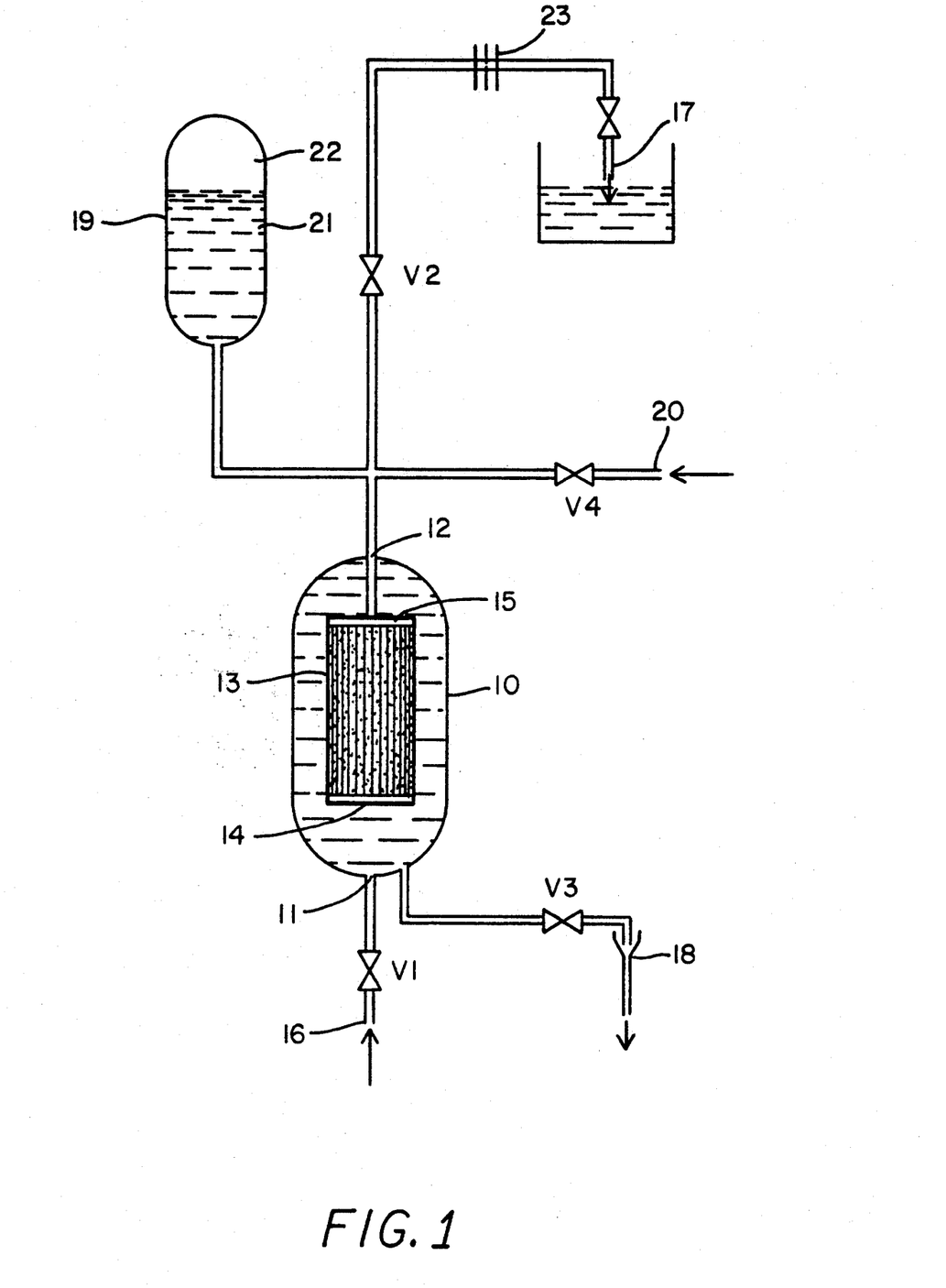
FIG. 1 is a schematic diagram of an apparatus illustrating a preferred embodiment of the present invention involving the use of a single filter.

As shown in Figure a preferred apparatus for treating contaminated water in accordance with the present invention comprises a housing 10 having an inlet 11 and an outlet 12 containing a filter medium 13. The filter medium may be of any suitable configuration and may be made of any suitable material such that the passage of contaminated water through the filter medium will result in a purified water stream and a back-flush of water will partially or wholly regenerate the filter medium. Preferred filter media for use with the present invention include regenerable sorbent beds, most preferably mixed sorbent beds of inorganic and carbonous sorbents. Prefilters (not shown) may also be used to prolong the life of the filter medium and may be used in a separate housing to facilitate change without disturbing the filter medium. The filter medium needs to be of such a construction or used in conjunction with appropriate materials, such as a cage or wire mesh, to ensure that it can adequately withstand the pressures involved with both the normal water flow, as well as the reverse backwash flow. The filter medium will have an upstream side 14 and a downstream side 15 and is positioned in the housing 10 between the inlet 11 and the outlet 12 so as to be capable of removing contaminants from the contaminated water without allowing any of the contaminated water to by-pass the filter medium 13. A contaminated water supply intake 16 is in fluid communication with the housing inlet to provide the contaminated water to the housing 10 and filter medium 13.

An effluent discharge outlet 17 is in fluid communication with the housing outlet 12 so as to provide the purified water to a user for reuse or to a waterway or sewage system. A drain 18 is in fluid communication with the upstream side 14 of the filter medium 13 so that back-flush water passed from the downstream side 15 to the upstream side 14 of the filter medium 13 to regenerate the filter medium 13 can be removed from the housing 10.

At least a portion of the water used in the back-flush operation is purified water which has been collected and stored in a suitable reservoir 19 in fluid communication with the downstream side 15 of the filter medium 13 such that a contaminated water stream flowing into the housing 10 through the housing inlet 11 contacts the upstream side 14 of the filter medium 13 and forms a purified water stream flowing from the housing 10 through the housing outlet 12 and partially fills the reservoir 19. A flow restrictor 23, installed between the housing outlet 12 and the effluent discharge outlet 17 so as not to obstruct the fluid flow path between the housing outlet 12 and reservoir 19, creates sufficient backpressure to cause purified water to flow into the reservoir 19. The purified water 21 in the reservoir 19 is maintained under pressure by the creation of a trapped air pocket 22 in the reservoir 19 formed by the inflow of purified water into the reservoir 19. The purified water 21 in the reservoir 19 is then available to back-flush the filter medium 13 to transport the removed contaminants from the filter medium 13 through the drain 18.

While the reservoir 19 of the present inventive apparatus may be of any suitable configuration and design consistent with the dictates of the present invention, the present inventive apparatus and the reservoir 19 are preferably of a construction such that purified water flowing into the reservoir 19 is maintained therein under pressure by action of the pressure of the purified water from the housing outlet 12 to the effluent discharge outlet 17. Such a pressure condition in the reservoir 19 can be suitably maintained by utilizing a reservoir having a lower outlet as shown in FIG. 1 and positioning the reservoir 19 at an elevation higher than the housing 10. Most preferably, the housing 10 is oriented in a direction such that the housing outlet 12 is at a higher elevation than the housing inlet 11, and the reservoir 19 is positioned at an elevation higher than the housing outlet 12 such that the inflow of purified water into the reservoir 19 creates a pocket of trapped, compressed air 22 which, when the flow of contaminated water into the housing 10 is stopped and water allowed to pass out the drain 18, will force the purified water 21 in the reservoir 19 into the housing 10 through outlet 12 and from the downstream side 15 to the upstream side 14 of the filter medium 13, thereby removing the contaminants which have collected onto the filter medium 13 and washing the contaminants through the drain 18.

In order to assure the proper functioning of the present invention, various flow control devices and valves may be employed. In particular, the present inventive apparatus preferably includes an inlet valve V-1, an outlet valve V-2, and a drain valve V-3. As depicted in FIG. 1, the inlet valve V-1 is preferably located between the contaminated water supply intake 16 and the housing inlet 11. The outlet valve V-2 is preferably located between the housing outlet 12 and the effluent discharge outlet 17 so as not to obstruct the fluid flow path between the housing 10 and reservoir 19. The valves are positioned such that closing inlet valve V-1 and outlet valve V-2 and opening drain valve V-3 enables purified water 21 from the reservoir 19 to pass through the filter medium 13 from the downstream side 15 to the upstream side 14 of the filter medium 13 so as to transport the contaminants removed by the filter medium 13 through the drain 18.

While the purified water 21 in the reservoir 19 is generally sufficient to accomplish the regeneration of the filter medium 13, more efficient regeneration of the filter medium 13 may be effected by use of water at an elevated temperature, preferably at a temperature of about 50°-98° C., more preferably at about 60°-85° C. Several sources of hot water are available for use in back-flushing the filter medium 13. The purified water 21 of the reservoir 19 may be maintained at an elevated temperature or passed through a device, such as a heater or heat exchanger, to increase the temperature of the purified water prior to use in the back-flushing operation. Preferably, however, the filter medium 13 and fluid flow path from the housing outlet 12 are purged with cooler water after the hot water back-flush. Accordingly, it is preferred that the purified water 21 of the reservoir 19 not be maintained at an elevated temperature or, if only a single line is used to connect the reservoir 19 with the housing 10, that the reservoir line not be passed through a device, such as a heater or heat exchanger, which restricts the outflow of purified water 21 from the reservoir 19 to being heated.

The present inventive apparatus preferably includes a separate hot water inlet 20 in fluid communication with the downstream side 15 of the filter medium 13 such that hot water can pass through the filter medium 13 from the downstream side 15 to the upstream side 14 of the filter medium 13 and transport the contaminants removed by the filter medium 13 through the drain 18. The hot water used to back-flush the filter medium 13 may be derived from any suitable source, and preferably is heated purified water derived separately from the reservoir 19. A valve V-4 is also preferably positioned between the hot water inlet 20 and the housing outlet 12 so as not to obstruct the purified water flow from the housing 10 to the effluent discharge outlet 17 and reservoir 19. After the hot water is used to back-flush the filter medium 13, the purified water 21 of reservoir 19 is used to back-flush and cool the filter medium 13. By use of at least some hot water for back-flushing of the filter medium 13, the total water requirement for regeneration of the filter medium 13 may be minimized.

If contaminated water is used as the hot water for the back-flushing operation, then the hot water inlet 20 and hot water fluid flow path to the housing 10 are preferably positioned such that the subsequent flow of purified water 21 from the reservoir 19 for the back-flushing operation will purge any contaminated water from the present inventive apparatus which remains downstream of the filter medium 13. Such a procedure will ensure that contaminated water does not flow out of the effluent discharge outlet 17 upon resumption of the purification process.

The backwashing or regeneration operation may be accomplished on a time basis (for example, nightly at 2 a.m.), by sensing the effluent discharge outlet contaminant level, or by cumulative usage. The backwash operation may be either manual or computer or timer controlled.

In normal service, valves V-1 and V-2 are open, and valves V-3 and V-4 are closed. The system pressure causes the reservoir 19 to partially fill with purified water 21, with the air pocket 22 being compressed by the water in the upper head of the reservoir 19. During regeneration, valves V-3 and V-4 are opened after closing valves V-1 and V-2. Hot water, under system pressure, flows through the filter medium 13, forcing contaminated water to the drain 18. At the end of regeneration, valve V-4 is closed (with valve V-3 remaining open), and the cold purified water 21 from the reservoir 19 is forced out of the reservoir 19 by the trapped air 22 through the filter medium 13, thereby cooling the filter medium to normal operating temperature. The use of the hot water, followed by cooling, results in a reduction in the quantity of backwash water required to effect regeneration and ensures that cool water will discharge from the filter medium 13 when returned to service upon the opening of valves V-1 and V-2 with the closure of valves V-3 and V-4.

Figure 2:
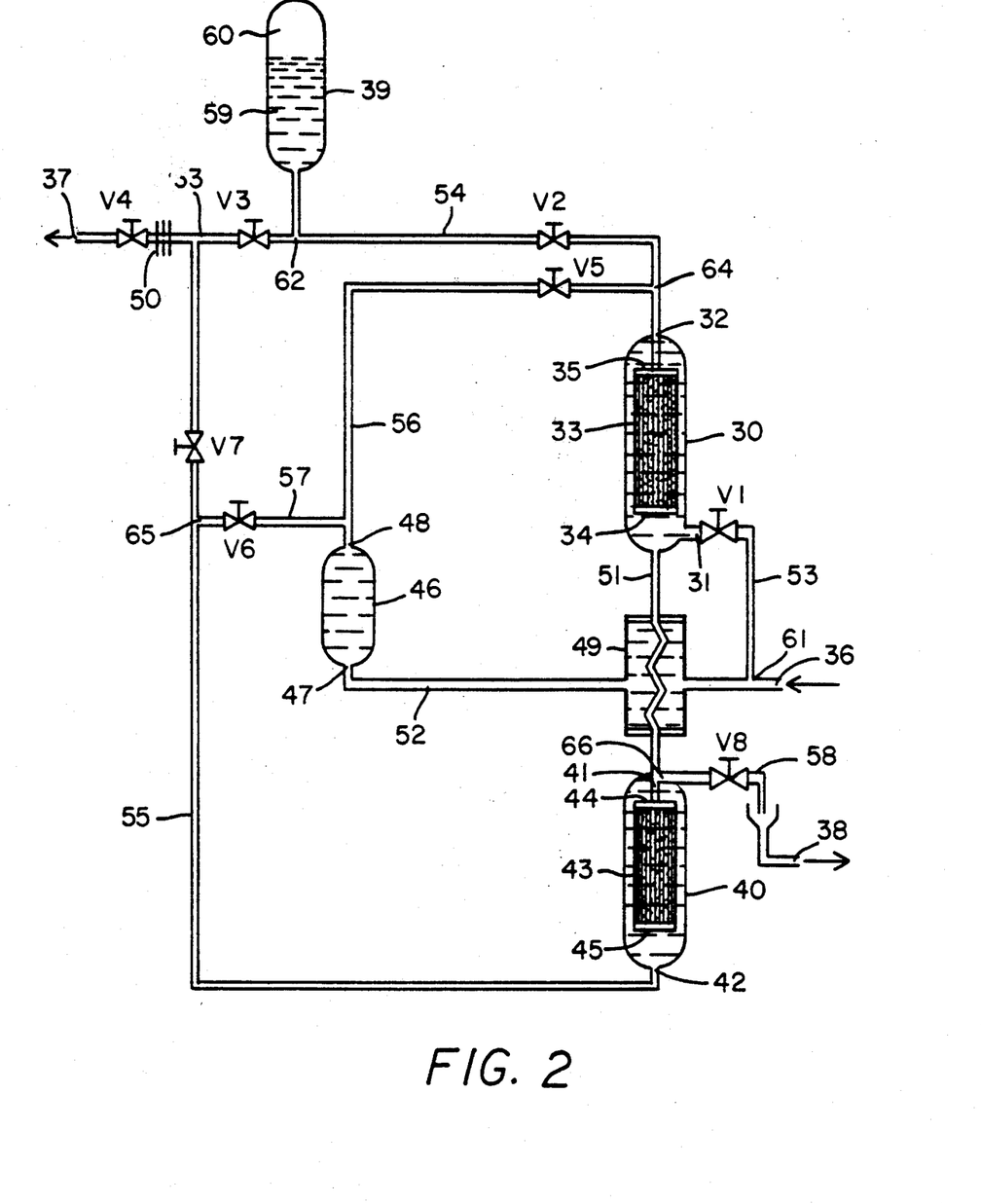
FIG. 2 is a schematic diagram of an apparatus illustrating a preferred embodiment of the present invention involving the use of multiple filters.

The present invention also contemplates more elaborate purification apparatus involving two or more filter media. For example, FIG. 2 illustrates another preferred embodiment of the present invention which involves the use of two filter media. As with respect to the apparatus of FIG. 1, the apparatus depicted in FIG. 2 similarly comprises a first housing 30 having an inlet 31 and an outlet 32, a first filter medium 33 having an upstream side 34 and a downstream side 35, a contaminated water supply intake 36, an effluent discharge outlet 37, a drain 38, and a reservoir 39 which provides for the storage of purified water 59 under pressure from a trapped compressed air pocket 60. A flow restrictor 50 is located between the housing outlet 32 and the effluent discharge outlet 37, so as not to obstruct the fluid flow path between the housing outlet 32 and reservoir 39, in order to create sufficient back-pressure to cause purified water to flow into the reservoir 39. The apparatus further comprises a second housing 40 having an inlet 41 and an outlet 42 and a second filter medium 43 having an upstream side 44 and a downstream side 45 and positioned in the second housing 40 between the second housing inlet 41 and the second housing outlet 42. The upstream side 44 of second filter medium 43 is in fluid communication with the upstream side 34 of the first filter medium 33 such that the second filter medium 43 is capable of removing contaminants from the contaminated back-flush from the first filter medium 33. As with the filter media described above in connection with the apparatus of FIG. 1, the first and second filter media 33 and 43 may be of any suitable design and configuration consistent with the intentions of present invention.

As shown in FIG. 2, the multi-filter media apparatus of the present invention preferably further comprises a heater 46 having an inlet 47 and an outlet 48, with the heater inlet 4 being in fluid communication with the contaminated water supply intake 36 and the heater outlet 48 being in fluid communication with the downstream side 35 of the first filter medium 33 such that the contaminated water can be heated to an elevated temperature, preferably about 50°-98° C., and most preferably about 60°-85° C., and used to back-flush the first filter medium 33 to transport the removed contaminants from the first filter medium 33 through the drain 38 or to the upstream side 44 of the second filter medium 43. Alternatively, the heater inlet 47 can be in fluid communication with a purified water source rather than a contaminated water source such that purified water is solely used to back-flush the filter media. This alternative embodiment is not depicted in FIG. 2.

The heater outlet 48 is further preferably in fluid communication with the downstream side 45 of the second filter medium 43 such that the contaminated water can be heated to an elevated temperature and used to back-flush the second filter medium 43 to transport the removed contaminants from the second filter medium 43 through the drain 38. Since the second filter medium 43 is used to filter the back-flush from the first filter medium 33, the concentration of contaminants in the back-flush water from the second filter medium 43 can be quite high and will be typically disposed of in a suitable manner.

The reservoir 39 is not only in fluid communication with the downstream side 35 of the first filter medium 33, but is preferably also in fluid communication with the downstream side 45 of the second filter medium 43. The purified water 59 of the reservoir 39 can thereby be used     ack-flush and cool both filter media 33 and 43 and provide for the purging of contaminated water in the apparatus downstream of the filter media 33 and 43.

Prior to the delivery of the back-flush water from the first filter medium 33 to the second filter medium 43 for purification, particularly as to such back-flush water that has been heated, the back-flush water is cooled, preferably to room temperature. Such a cooling process may be effected by any suitable means, preferably by use of a heat exchanger 49 between the first housing inlet 31 and the second housing inlet 41 which is capable of reducing the temperature of the back-flush water flowing between the first housing inlet 31 and the second housing inlet 41, while simultaneously heating the water flowing from the water supply intake 36 to the heater inlet 47.

As shown in FIG. 2, the apparatus comprises a first fluid flow path 51 between the first housing inlet 31 and second housing inlet 41, a second fluid flow path 52 between the contaminated water supply intake 36 and the heater inlet 47, and a heat exchanger 49 which utilizes the water flowing through the second fluid flow path 52 to reduce the temperature of the water flowing through the first fluid flow path 51 and to elevate the temperature of the water flowing through the second fluid flow path 52.

The apparatus preferably further comprises a third fluid flow path 53 between the contaminated water supply intake 36 and the first housing inlet 31 such that the third fluid flow path 53 is in fluid communication with the second fluid flow path 52 at a first connection point 61 between the contaminated water supply intake 36 and the heat exchanger 49 on the second fluid flow path 52.

The apparatus also preferably comprises a fourth fluid flow path 54 from the first housing outlet 32 to the effluent discharge outlet 37 such that the reservoir 39 is in fluid communication with the fourth fluid flow path 54 at a second connection point 62 between the first housing outlet 32 and the effluent discharge outlet 37. The preferred embodiment of FIG. 2 further comprises a fifth fluid flow path 55 from the second housing outlet 42 to the effluent discharge outlet 37 such that the fifth fluid flow path 55 is in fluid communication with the fourth fluid flow path 54 at a third connection point 63 between the reservoir 39 and the effluent discharge outlet 37.

The preferred embodiment of the multi-filter media apparatus depicted in FIG. 2 further comprises a sixth fluid flow path 56 from the heater outlet 48 to the first housing outlet 32 such that the sixth fluid flow path 56 is in fluid communication with the fourth fluid flow path 54 at a fourth connection point 64 between the first housing outlet 32 and the reservoir 39, a seventh fluid flow path 57 from the heater outlet 48 to the second housing outlet 42 such that the seventh fluid flow path 57 is in fluid communication with the fifth fluid flow path 55 at a fifth connection point 65 between the second housing outlet 42 and the third connection point 63, and an eighth fluid flow path 58 between the first housing inlet 31 and the drain 38 such that the eighth fluid flow path 58 is in fluid communication with the first fluid flow path 51 at a sixth connection point 66 between the heat exchanger 49 and the second housing inlet 41.

As with respect to the single filter medium apparatus depicted in FIG. 1, a multi-filter media apparatus may employ suitable valves at appropriate positions to ensure the easy and proper functioning of the apparatus for its intended purpose. The preferred apparatus depicted in FIG. 2 includes a first valve V-1 between the first connection point 61 and the first housing inlet 31, a second valve V-2 between the second connection point 62 and the fourth connection point 64, a third valve V-3 between the second connection point 62 and the third connection point 63, a fourth valve V-4 between the third connection point 63 and the effluent discharge outlet 37, a fifth valve V-5 between the heater outlet 48 and the fourth connection point 64 which does not obstruct the seventh fluid flow path 57, a sixth valve V-6 between the heater outlet 48 and the fifth connection point 65 which does not obstruct the sixth fluid flow path 56, a seventh valve V-7 between the fifth connection point 65 and the third connection point 63, and an eighth valve V-8 between the sixth connection point 66 and the drain 38.

Under normal service, contaminated water enters the apparatus of FIG. 2 through the contaminated water supply intake 36, passes through valve V-1, is purified by the first filter medium 33, and passes out of the system through open valves V-2, V-3, and V-4. Valves V-5 through V-8 are normally closed. Purified water 59 is collected in reservoir 39 and maintained under pressure by way of the trapped air pocket 60. Regeneration is initiated by opening valves V-5 and V-7 and closing valves V-1, V-2, and V-3. The contaminated water then enters the system through the heat exchanger 49, passes through the heater 47 where its temperature is elevated to a sufficient level to accomplish regeneration, flows through the contaminated first filter medium 33 desorbing the contaminants from the first filter medium 33, passes through the heat exchanger 49 where it is cooled, passes through the second filter medium 43 where it is purified, and then passes out to the effluent discharge outlet 37 through valves V-7 and V-4. Valve V-5 is then closed and thereafter V-2 is opened to allow cold purified water 59 of the reservoir 39 to back-flush and cool the first filter medium 33. The back-flush water flushes through the heat exchanger 49, through the second filter medium 43 where it is purified, and then passes out through the effluent discharge outlet 37.

After cooling of the first filter medium 33, valves V-2 and V-7 are closed, and valves V-6 and V-8 are opened. The contaminated water from the contaminated water supply intake 36 flows through the heater 46 and second filter medium 43 to accomplish its regeneration and then to the drain 38. In the second filter medium 43, the contaminant loading will be much higher than in the first filter medium 33 because of the increased concentration of contaminants in the backwash water emerging from the first filter medium 33. When the second filter medium 43 is regenerated, valves V-4 and V-6 are closed, and valves V-3 and V-7 are opened to allow the cold purified water 59 from the reservoir 39 to flow through the second filter medium 43 to the drain 38. The system is then returned to normal service by opening valves V-1 through V-4 and closing valves V-5 through V-8.

The multiple filter media system provides purified water with minimum backwash water and maximum concentration of contaminants in the drain line. A single filter design as illustrated in FIG. 1 may require 1 gallon of backwash water for every 3 to 4 gallons of contaminated water treated. With the proposed two filter system as illustrated in FIG. 2, 1 gallon of backwash water may be required for every 6 to 8 gallons of water treated. If higher backwash efficiencies are required, more stages (i.e., more filters) can be added to further concentrate the contaminants in a reduced volume waste stream which can be drummed and properly disposed. Alternately, two filters can be used to further concentrate the contaminants by cyclically passing the contaminants back and forth between the two filter media during regenerations until either the contaminant reaches its saturation level or the filter medium becomes completely filled with contaminants, at which time the filter medium may be regenerated with the backwash water being diverted to the drain. The system may then be returned to normal service as previously described.

The efficiency of the backwashing is dependent on the nature of the specific contaminant(s) and the filter media. Volatile organic compounds, for example, will typically be almost completely removed from the filter during regeneration, whereas pesticides and oil will typically be removed to a much lesser extent. Nevertheless, under expected conditions, even a heavily contaminated water site (such as a Superfund site), the life of the filter medium should be extended by a factor of about 3 to about 5, i.e., a consumable filter designed for a one year life will provide approximately a three to five year service life in the context of the present invention.

While this invention has been described with an emphasis upon preferred embodiments, it will be obvious to those of ordinary skill in the art that variations in the preferred process and apparatus may be utilized and that it is intended that the invention may be practiced otherwise than as specifically described herein. Accordingly, this invention includes all modifications encompassed within the spirit and scope of the invention as defined by the following claims.

What is claimed is:

1. A process for treating contaminated water comprising the steps of:
    (a) passing water containing a contaminant as a stream through a filter to remove said contaminant and form a purified water stream,
    (b) directing said purified water stream to an effluent discharge outlet and channeling a portion of said purified water into a reservoir wherein said purified water is maintained under pressure through action of a trapped air pocket in said reservoir, and
    (c) regenerating said filter by using at least a portion of said purified water in said reservoir to back-flush said filter by action of said pressure.

2. The process of claim 1, wherein said purified water in said reservoir is maintained therein until used to back-flush said filter by action of the pressure of the purified water in said reservoir directed from said filter to said effluent discharge outlet.

3. The process of claim 1, wherein said filter is back-flushed with either said purified or contaminated water which has been heated.

4. A process for treating contaminated water comprising the steps of:
    (a) passing water containing a contaminant as a stream through a filter to remove said contaminant and form a purified water stream,
    (b) directing said purified water stream to an effluent discharge outlet and channeling a portion of said purified water in a reservoir wherein said purified water is maintained under pressure, and
    (c) regenerating said filter by passing either said purified or contaminated water which has been heated through said filter to back-flush said filter and then passing at least a portion of said purified water in said reservoir through said filter.

5. The process of claim 4, wherein said filter is back-flushed with at least a portion of said purified water in said reservoir which has been heated.

6. The process of claim 1, wherein said back-flush water is passed through a second filter to remove said contaminants and form a purified water stream.

7. The process of claim 1, which process further comprises regenerating said second filter by using either said purified or contaminated water which has been heated to back-flush said second filter.

8. The process of claim 1, which process further comprises passing at least a portion of said purified water in said reservoir through said second filter to further back-flush said second filter.

9. The process of claim 8, wherein said hot back-flush water from said first filter is cooled before passing through said second filter.

10. The process of claim 9, wherein said first and second filters are back-washed with said contaminated water which has been heated and said hot back-flush water from said first filter is cooled by passing through a heat exchanger which also serves to heat said contaminated water used to back-flush said first and second filters.

11. An apparatus for treating contaminated water comprising:
    (a) a housing having an inlet and an outlet,
    (b) a filter medium having an upstream side and a downstream side and positioned in said housing between said inlet and said outlet so as to be capable of removing contaminants from said contaminated water,
    (c) a contaminated water supply intake in fluid communication with said housing inlet,
    (d) an effluent discharge outlet for purified water in fluid communication with said housing outlet,
    (e) a drain in fluid communication with said upstream side of said filter medium, and
    (f) a reservoir in fluid communication with said downstream side of said filter medium, wherein said apparatus is of a construction such that a contaminated water stream flowing into said housing through said housing inlet contacts said upstream side of said filter medium and forms a purified water stream flowing from said housing through said housing outlet to said effluent discharge outlet and is channeled into said reservoir and maintained under pressure therein through action of a trapped air pocket in said reservoir, at least a portion of said purified water in said reservoir being available to back-flush said filter medium by action of said pressure to transport said removed contaminants from said filter medium through said drain.

12. The apparatus of claim 11, wherein said apparatus is of a construction such that purified water in said reservoir is maintained therein until used to back-flush said filter medium by action of the pressure of the purified water directed from said housing outlet to said effluent discharge outlet.

13. The apparatus of claim 11, wherein said housing outlet is positioned at an elevation higher than said housing inlet and said reservoir is positioned at an elevation higher than said housing outlet.

14. The apparatus of claim 11, wherein said apparatus further comprises an inlet valve, an outlet valve, and a drain valve.

15. The apparatus of claim 14, wherein said apparatus is of a construction such that closing said inlet valve and said outlet valve and opening said drain valve enables purified water from said reservoir to pass through said filter medium from said downstream side to said upstream side of said filter medium and transport said contaminants removed by said filter medium through said drain.

16. An apparatus for treating contaminated water comprising:
    (a) a housing having an inlet and an outlet,
    (b) a filter medium having an upstream side and a downstream side and positioned in said housing between said inlet and said outlet so as to be capable of removing contaminants from said contaminated water,
    (c) a contaminated water supply intake in fluid communication with said housing inlet,
    (d) an effluent discharge outlet in fluid communication with said housing outlet,
    (e) a drain in fluid communication with said upstream side of said filter medium,
    (f) a reservoir in fluid communication with said downstream side of said filter medium such that hot water can pass through said filter medium from said downstream side to said upstream side of said filter medium and transport said contaminants removed by said filter medium away from said filter medium, and
    (g) a reservoir in fluid communication with said downstream side of said filter medium, wherein said apparatus is of a construction such that a contaminated water stream flowing into said housing through said housing inlet contacts said upstream side of said filter medium and forms a purified water stream flowing from said housing through said housing outlet which enters said reservoir and is maintained under pressure therein through action of a trapped air pocket in said reservoir, at least a portion of said purified water in said reservoir being available to back-flush said filter medium.

17. The apparatus of claim 11, wherein said apparatus further comprises a second housing having an inlet and an outlet and a second filter medium having an upstream side and a downstream side and positioned in said second housing between said second housing inlet and said second housing outlet, said upstream side of second filter medium being in fluid communication with said upstream side of said first filter medium such that said second filter medium is capable of removing contaminants from said contaminated back-flush from said first filter medium.

18. An apparatus for treating contaminated water comprising:
(a) a first housing having an inlet and an outlet,
(b) a second housing having an inlet and an outlet, said second housing inlet being in fluid communication with said first housing inlet,
(c) a first filter medium having an upstream side and a downstream side and positioned in said first housing between said first housing inlet and said first housing outlet so as to be capable of removing contaminants from said contaminated water,
(d) a second filter medium having an upstream side and a downstream side and positioned in said second housing between said second housing inlet and said second housing outlet so as to be capable of removing contaminants from said contaminated water,
(e) a contaminated water supply intake in fluid communication with said first housing inlet,
(f) an effluent discharge outlet for purified water in fluid communication with said first and second housing outlets,
(g) a drain in fluid communication with said upstream side of said first filter medium,
(h) a heater having an inlet and an outlet, said heater inlet being in fluid communication with said contaminated water supply intake and said heater outlet being in fluid communication with said downstream side of said first filter medium such that said contaminated water can be heated to an elevated temperature and used to back-flush said first filter medium to transport said removed contaminants from said first filter medium through said drain or to said upstream side of said second filter medium, and
(i) a reservoir in fluid communication with said downstream side of said first filter medium, wherein said apparatus is of a construction such that a contaminated water stream flowing into said first housing through said first housing inlet contacts said upstream side of said first filter medium and forms a purified water stream flowing from said first housing through said first housing outlet which enters said reservoir and is maintained under pressure therein through action of a trapped air pocket in said reservoir, at least a portion of said purified water in said reservoir being available to back-flush said first filter medium to transport said removed contaminants from said first filter medium to said drain or said second filter means.

19. The apparatus of claim 18, wherein said heater outlet is further in fluid communication with said downstream side of said second filter medium such that said contaminated water can be heated to an elevated temperature and used to back-flush said second filter medium to transport said removed contaminants from said second filter medium through said drain.

20. The apparatus of claim 19, wherein said reservoir is further in fluid communication with said downstream side of said second filter medium.

21. The apparatus of claim 20, wherein said apparatus further comprises a heat exchanger between said first housing inlet and said second housing inlet which is capable of reducing the temperature of said back-flush water flowing between said first housing inlet and said second housing inlet.

22. The apparatus of claim 20, wherein said apparatus further comprises a first fluid flow path between said first housing inlet and said second housing inlet, a second fluid flow path between said contaminated water supply intake and said heater inlet, and a heat exchanger which utilizes said water flowing through said second fluid flow path to reduce the temperature of said water flowing through said first fluid flow path.

23. The apparatus of claim 22, wherein said apparatus further comprises a third fluid flow path between said contaminated water supply intake and said first housing inlet, and said third fluid flow path is in fluid communication with said second fluid flow path at a first connection point between said contaminated water supply intake and said heat exchanger on said second fluid flow path.

24. The apparatus of claim 23, wherein said apparatus further comprises a fourth fluid flow path from said first housing outlet to said effluent discharge outlet and said reservoir is in fluid communication with said fourth fluid flow path at a second connection point between said first housing outlet and said effluent discharge outlet.

25. The apparatus of claim 24, wherein said apparatus further comprises a fifth fluid flow path from said second housing outlet to said effluent discharge outlet and said fifth fluid flow path is in fluid communication with said fourth fluid flow path at a third connection point between said reservoir and said effluent discharge outlet.

26. The apparatus of claim 25, wherein said apparatus further comprises a sixth fluid flow path from said heater outlet to said first housing outlet with said sixth fluid flow path being in fluid communication with said fourth fluid flow path at a fourth connection point between said first housing outlet and said reservoir, a seventh fluid flow path from said heater outlet to said second housing outlet with said seventh fluid flow path being in fluid communication with said fifth fluid flow path at a fifth connection point between said second housing outlet and said third connection point, and an eighth fluid flow path between said first housing inlet and said drain with said eighth fluid flow path being in fluid communication with said first fluid flow path at a sixth connection point between said heat exchanger and said second housing inlet.

27. The apparatus of claim 26, wherein said apparatus further comprises a first valve between said first connection point and said first housing inlet, a second valve between said second connection point and said fourth connection point, a third valve between said second connection point and said third connection point, a fourth valve between said third connection point and said effluent discharge outlet, a fifth valve between said heater outlet and said fourth connection point, a sixth valve between said heater outlet and said fifth connection point, a seventh valve between said third connection point and said fifth connection point, and an eighth valve between said sixth connection point and said drain.

28. A process for treating contaminated water comprising the steps of:
(a) passing water containing a contaminant as a stream through a first filter to remove said contaminant and form a purified water stream,
(b) directing said purified water stream to an effluent discharge outlet and accumulating a portion of said purified water in a reservoir wherein said purified water is maintained under pressure through action of a trapped air pocket in said reservoir, (c) regenerating said first filter by using either said purified or contaminated water which has been heated to back-flush said first filter and then using at least a portion of said purified water in said reservoir to further back-flush said first filter, so as to form a back-flush water stream containing said contaminants removed by said first filter, and (d) passing said back-flush water stream through a second filter to remove said contaminants and form a purified water stream.

29. The process of claim 28, wherein said first filter is regenerated by using said contaminated water which has been heated to back-flush said first filter.

* * * * *

UNITED STATES PATENT AND TRADEMARK OFFICE
CERTIFICATE OF CORRECTION

PATENT NO. : 5,281,344

DATED : January 25, 1994

INVENTOR(S) : JOHN P. MILLER, P. GLENN BARKLEY, DANA E. GINGRICH AND DONALD H. WHITE, JR.

It is certified that error appears in the above-identified patent and that said Letters Patent is hereby corrected as shown below:

Column 4, line 40, after "Figure" insert -- 1 --;

Column 4, line 67, after "inlet" insert -- 11 --; and

Column 7, line 54, delete "4" and substitute therefor -- 47 --.

Column 11, line 12, delete "channeling" and substitute therefor -- accumulating --;

Column 11, line 26, delete "claim 1" and substitute therefor -- claim 29 --;

Column 11, line 30, delete "claim 1" and substitute therefor -- claim 7 --;

Column 12, line 41, delete "reservoir" and substitute therefor -- hot water inlet --; and Column 13, line 52, delete "means" and substitute therefor -- medium --.

Signed and Sealed this

Fifteenth Day of November, 1994

Attest:

BRUCE LEHMAN

*Attesting Officer*  *Commissioner of Patents and Trademarks*